United States Patent

Prasad et al.

(10) Patent No.: US 9,338,196 B2
(45) Date of Patent: May 10, 2016

(54) MALICIOUS CALL DETECTION APPARATUS, MALICIOUS CALL DETECTING METHOD AND COMPUTER PROGRAM FOR DETECTING MALICIOUS CALLS

(75) Inventors: Anand Raghawa Prasad, Tokyo (JP); Thilo Ewald, Heidelberg (DE); Toshiyuki Tamura, Tokyo (JP); Stefan Schmid, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 422 days.

(21) Appl. No.: 13/266,376

(22) PCT Filed: Apr. 28, 2010

(86) PCT No.: PCT/JP2010/003045
§ 371 (c)(1),
(2), (4) Date: Dec. 30, 2011

(87) PCT Pub. No.: WO2010/125815
PCT Pub. Date: Nov. 4, 2010

(65) Prior Publication Data
US 2012/0110170 A1    May 3, 2012

(30) Foreign Application Priority Data
Apr. 30, 2009 (JP) .................................. 2009-110816

(51) Int. Cl.
*G06F 15/173* (2006.01)
*H04L 29/06* (2006.01)
*H04M 3/436* (2006.01)

(52) U.S. Cl.
CPC ........ *H04L 65/1079* (2013.01); *H04L 65/1006* (2013.01); *H04M 3/436* (2013.01); *H04M 2242/14* (2013.01)

(58) Field of Classification Search
USPC .................................................. 709/224–226
See application file for complete search history.

(56) References Cited

U.S. PATENT DOCUMENTS 7,711,779 B2   5/2010   Goodman et al.
8,243,716 B2   8/2012   Liu et al.
(Continued)

FOREIGN PATENT DOCUMENTS

CN           1937671        3/2007
DE       10 2005 046 375    3/2007
(Continued)

OTHER PUBLICATIONS

International Search Report, PCT/JP2010/003045, Aug. 10, 2010.
(Continued)

*Primary Examiner* — Chris Parry
*Assistant Examiner* — Weiwei Stiltner
(74) *Attorney, Agent, or Firm* — Young & Thompson

(57) ABSTRACT

To improve detection accuracy of SPIT, first, an identification information gathering apparatus receives various identification information from an IP phone terminal which has transmitted an INVITE message. A PUCI server generates bind identification information by binding or associating various identification information received from an identification information gathering apparatus via an SIP server and registers the bind identification information to a gray list stored in a list storing portion. A SPIT determination portion evaluates the bind identification information in reference to the gray list and determines whether or not the session start request from the IP phone terminal is allowed.

5 Claims, 11 Drawing Sheets

(56) References Cited

U.S. PATENT DOCUMENTS

| | | | |
|---|---|---|---|
| 8,406,396 B2* | 3/2013 | Prasad et al. | 379/142.05 |
| 2004/0139020 A1* | 7/2004 | Ono | 705/44 |
| 2007/0039040 A1 | 2/2007 | McRae et al. | |
| 2007/0177607 A1 | 8/2007 | Niccolini et al. | |
| 2007/0199053 A1* | 8/2007 | Sandhu et al. | 726/4 |
| 2009/0089869 A1* | 4/2009 | Varghese | 726/7 |
| 2009/0106318 A1* | 4/2009 | Mantripragada et al. | 707/104.1 |

FOREIGN PATENT DOCUMENTS

| | | |
|---|---|---|
| DE | 102005046966 | 4/2007 |
| DE | 10 2006 012 658 | 9/2007 |
| JP | 2003-018324 | 1/2003 |
| JP | 2003-179684 | 6/2003 |
| JP | 2003-234826 | 8/2003 |
| JP | 2004-289630 | 10/2004 |
| JP | 2005-011325 | 1/2005 |
| JP | 2007-116542 | 5/2007 |
| JP | 2008-048055 | 2/2008 |
| WO | 2006000466 | 1/2006 |
| WO | 2007039350 | 4/2007 |
| WO | WO 2007134810 A1 * | 11/2007 |
| WO | WO 2008/040539 | 4/2008 |

OTHER PUBLICATIONS

European Search Report—EP 10 76 9515—Dec. 3, 2012.
Nico D'Heureuse et al.: "Protecting SIP-Based Networks and Services from Unwanted Communications", Global Telecommunications Conference, 2008. IEEE Globecom 2008. IEEE, IEEE, Piscataway, NJ, USA, Nov. 30, 2008, pp. 1-5, XP031370767, ISBN: 978-1-4244-2324-8 *Section II; Section IV.Stage 1; p. 2-p. 3.
JP Notice of Allowance dated Jan. 14, 2014, with partial English Translation; Application No. 2011-511318.
EP Office Action dated Dec. 4, 2013, with English Translation; Application No. 10 769 515.7.
JP Notice of Allowance dated Dec. 10, 2013, with partial English Translation; Application No. 2012-518149.
Virgil Gligor et al.: "Security of Emergent Properties in Ad-Hoc Networks (Transcript of Discussion)", Jan. 1, 2006, Security Protocols Lecture Notes in Computer Science;; LNCS, Springer, Berlin, DE, pp. 256-266.
CN Office Action dated Sep. 17, 2013, with English translation; Application No. 201080017055.3.

* cited by examiner

FIG. 4

IDENTIFICATION INFORMATION

| PROPERTY TYPE | IDENTIFICATION INFORMATION |
|---|---|
| APPARATUS INFORMATION | MAC ADDRESS |
|  | CPU ID |
|  | OS TYPE |
|  | OS VERSION |
|  | SOFTWARE CONSTITUTION |
| USER INFORMATION | SIP ID |
|  | IMSC |
| LOCATION INFORMATION | IP ADDRESS |
|  | LOCATION INFORMATION |
| TIME INFORMATION | TIME INFORMATION |

MALICIOUS CALL DETECTION APPARATUS, MALICIOUS CALL DETECTING METHOD AND COMPUTER PROGRAM FOR DETECTING MALICIOUS CALLS

BACKGROUND OF THE INVENTION

1. Technical Field

The present invention relates to a technique for detecting malicious calls, for example, spam and crank calls of IP phones.

Priority is claimed on Japanese Patent Application No. 2009-110816, filed Apr. 30, 2009, the content of which is incorporated herein by reference.

2. Background Art

Due to spread or generalization of the Internet, services using the Internet, for example, an e-mail service and a Web service are widely used in a general life. Further, in recent years, IP (Internet protocol) phones which can conduct voice communication via the Internet have been being generally used.

Today, the internet and various services using thereof are sufficiently provided, and on the other hand, in e-mail services, there is a social problem of e-mails which are called spam or junk mails and which are transmitted in a one-way manner while a person who receives such mails does not want. Further, such problematic actions are conducted in the IP phone as well. For example, by calling a phone number of an IP phone which is randomly selected or by successively calling a series of phone numbers, when a connection is successfully established, a voice messages is played back which is, for example, a recorded voice or a synthesized voice. Such a spam on the IP phone is called SPIT (Spam Over Internet Telephone) (for example, see Patent Document 1).

In conventional techniques, there is only one method for determining whether or not an incoming call of an IP phone is SPIT and that is by checking the user ID of the caller side IP phone. For example, user IDs of both dealers who transmit the SPIT and transmitters who are already known as specific persons (SPIT transmitters) are listed on a blacklist, user IDs of persons who are permitted communication are listed on a white list, and in accordance with such a method, incoming calls from SPIT transmitters who are already known are denied.

Patent Document 1: PCT Patent Application No. WO/2008/040539

However, the user IDs can be copied, and if the SPIT transmitter uses the user ID of a third person (a disguise) and makes a phone call (a disguised call), there is a possibility in which such a malicious call is accepted by evading the blacklist and passing through the white list. In such a case, the called person may respond to the call without detecting the disguised call.

The present invention is conceived to resolve the above-described problems and has an object to provide a malicious call detection apparatus, a malicious call detecting method and a computer program for detecting a malicious call that can improve detection accuracy.

SUMMARY OF THE INVENTION

The present invention may provide, for example, means of [1]-[9] described below to resolve the above-identified problems.

[1] A malicious call detection apparatus includes:
an input means which receives multiple types of identification information with regard to an IP communication apparatus which issued a session start request;
a storing means which binds or associates said multiple types of the received identification information and stores the identification information by registering the identification information on a list; and
a determination means which evaluates said multiple types of the received identification information in reference to the list and which determines whether or not the session start request from the IP communication apparatus is to be allowed.

[2] In the above-described malicious call detection apparatus, the determination means evaluates said multiple types of identification information by using a weight coefficient corresponding to each of said types of the identification information.

[3] In the above-described malicious call detection apparatus of [1] or [2], said multiple types of the identification information include at least one of property information including apparatus information with regard to the IP communication apparatus, user information, location information and time information.

[4] A malicious call detection method includes:
a receiving step of receiving multiple types of identification information with regard to an IP communication apparatus which issued a session start request;
a storing step of binding or associating said multiple types of the received identification information and storing the identification information by registering the identification information to a list; and
a determination step of evaluating said multiple types of the received identification information in reference to the list and determining whether or not the session start request from the IP communication apparatus is allowed.

[5] In the above-described malicious call detection method of [4], in said determination step, said multiple types of the identification information is evaluated by using a weight coefficient corresponding to each of said types of the identification information.

[6] In the above-described malicious call detection method of [4] or [5], said multiple types of the identification information includes at least one of property information including apparatus information with regard to the IP communication apparatus, user information, location information and time information.

[7] A malicious call detection program which is a computer program stored in a computer readable recording medium of a malicious call detection apparatus connected to a plurality of IP communication apparatuses via a network, and which is executed by a computer of the malicious call detection apparatus, includes instructions for execution of:
a receiving step of receiving multiple types of identification information with regard to an IP communication apparatus which issued a session start request;
a storing step of binding or associating said multiple types of the received identification information and storing the identification information by registering the identification information to a list; and
a determination step of evaluating said multiple types of the received identification information in reference to the list and determining whether or not the session start request from the IP communication apparatus is allowed.

[8] In the above-described malicious call detection program of [7] which is executed by the computer, in said determination step, said multiple types of the identification information is evaluated by using a weight coefficient corresponding to each of said types of identification information.

[9] In the above-described malicious call detection program of [7] or [8] which is executed by the computer, said multiple types of the identification information includes at least one of property information including apparatus information with regard to the IP communication apparatus, user information, location information and time information.

In accordance with the present invention, it is possible for an IP communication apparatus which received a session start request to determine whether or not the request is a malicious call with high accuracy.

BRIEF DESCRIPTION OF THE DRAWINGS

FIG. 4 is a drawing showing examples of various identification information.

DETAILED DESCRIPTION OF THE INVENTION

Hereinafter, embodiments of the present invention are explained in reference to the drawings.

First Embodiment

Figure 1:
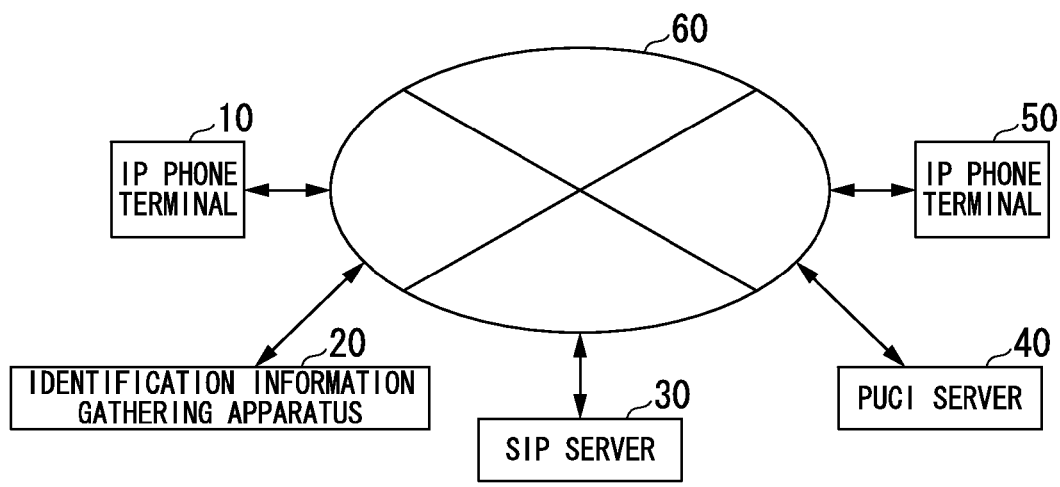
FIG. 1 is an outline constitutional drawing of an IP phone communication system to which a malicious call detection apparatus of a first embodiment is applied.

FIG. 1 is an outline constitutional drawing of an IP (Internet protocol) phone communication system to which a malicious call detection apparatus of a first embodiment is applied. In the drawing, the IP phone communication system includes IP phone terminals 10 and 50, an identification information gathering apparatus 20, an SIP (session initiation protocol) server 30 and a PUCI (preventing unsolicited communication for Internet multimedia subsystem) server 40 that are connected via a network 60 to each other.

It should be noted that in this embodiment, a function of a malicious call detection apparatus is included in the identification information gathering apparatus 20, the SIP server 30 and the PUCI server 40 of the IP phone communication system 1. Further, this embodiment is explained under an assumption in which the IP phone terminal 10 is a calling party (calling source), in other words, the IP phone terminal 10 is an IP phone terminal which is monitored, and in which the IP phone terminal 50 is a receiving side (calling destination).

Figure 2:
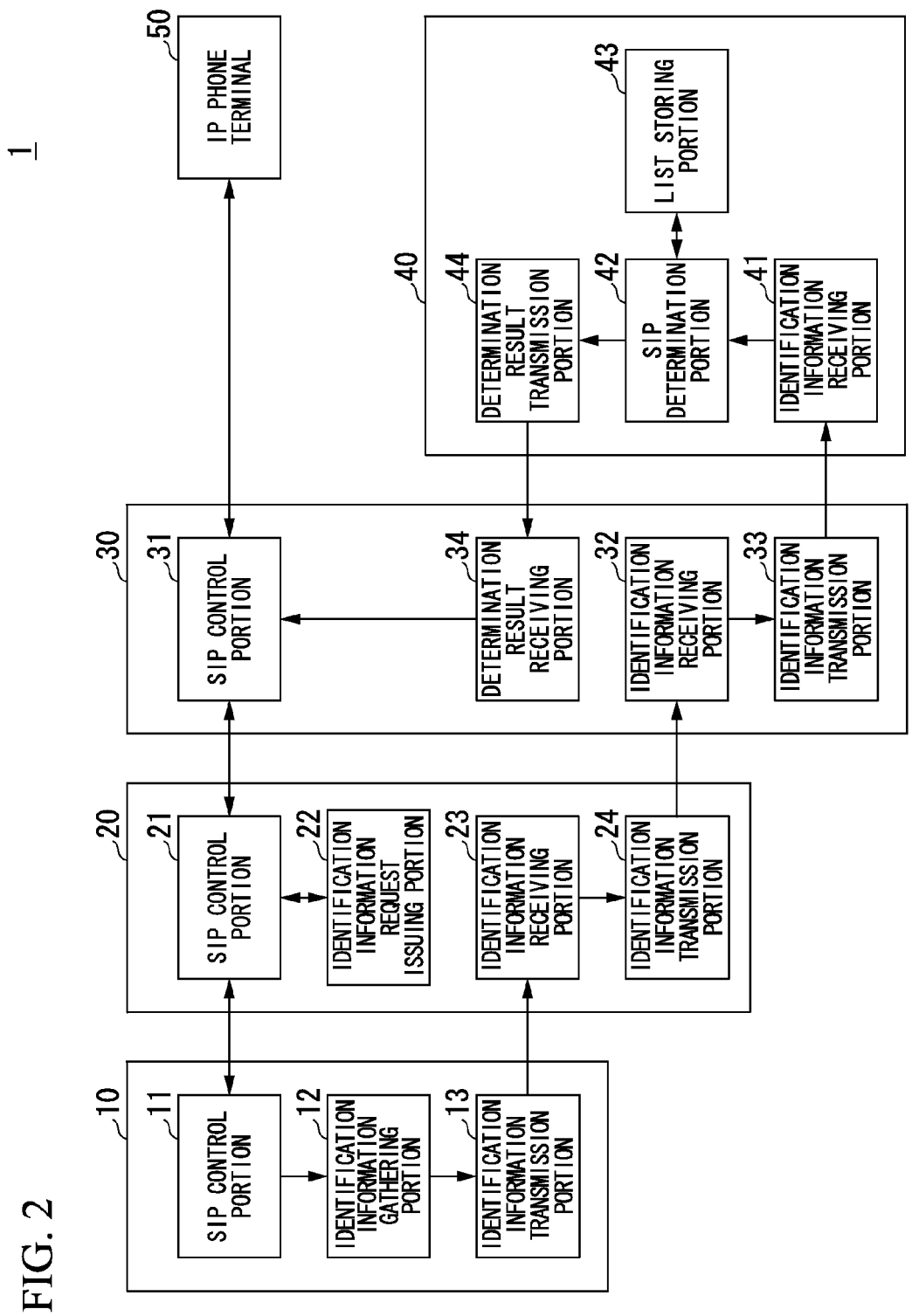
FIG. 2 is a functional block diagram showing main functional blocks which are necessary for explaining an IP phone communication system of a first embodiment.

FIG. 2 is a block diagram showing main functional blocks which are necessary for explaining the IP phone communication system 1 of this embodiment. In this drawing, the IP phone 10 includes an SIP control portion 11, an identification information gathering portion 12 and an identification information transmission portion 13. It is not shown in the drawings, however, the IP phone terminal 50 has the same constitution as the IP phone terminal 10. Further, the identification information gathering apparatus 20 includes an identification information request issuing portion 22, an identification information receiving portion 23 and an identification information transmission portion 24. Further, the SIP server 30 includes an SIP control portion 31, an identification information receiving portion 32 an identification information transmission portion 33 and a determination result receiving portion 34. Further, the PUCI server 40 includes an identification information receiving portion 41, a SPIT determination portion 42, a list storing portion 43 and a determination result transmission portion 44.

The IP phone terminals 10 and 50 are terminals for the IP phone that can communicate via the network 60. It is not shown in the drawings, however, the IP phone terminals 10 and 50 are constituted from devices for constituting IP phone apparatuses, for example, an IP phone adapter and a telephone set. In accordance with an identification information request transmitted from the identification information gathering apparatus, the IP phone terminal 10 requests the identification information gathering portion 12 to gather various identification information. After this, the IP phone terminal 10 transmits the gathered various identification information to the identification information gathering apparatus 20. Details of the various identification information are explained in an operation description below.

It should be noted that the IP phone terminals 10 and 50 are not limited to the terminals for the IP phone and can be IP communication apparatuses.

The identification information gathering apparatus 20 relays SIP messages between the IP phone terminal 10 which is monitored and the SIP server 30. The identification information gathering apparatus 20 gathers the various identification information from the IP phone terminal 10 and transmits the various identification information to the SIP server 30. Concretely, for example, when receiving a session attendance request (INVITE) of the SIP transmitted from the IP phone terminal 10, the identification information gathering apparatus 20 transmits the identification information request issued by the identification information request issuing portion 22 to the IP phone terminal 10. In addition, when receiving the various identification information from the IP phone terminal 10, the identification information gathering apparatus 20 transmits the various identification information to the SIP server 30.

The SIP server 30 is arranged at a position between the IP phone terminal 10 which is a calling source and the IP phone terminal 50 which is a calling destination. The SIP server 30 includes functions of a proxy server for routing SIP messages, a registrar for registering a combination of an SIP URI (uniform resource identifier) and an IP address, and a location server. Further, the SIP server 30 is a server which conducts a call control operation of the IP phone terminals 10 and 50 based on both the SIP and SPIT determination results provided by and PUCI server 40. In other words, in the SIP server 30, when the determination result receiving portion 34 receives the SPIT determination result transmitted from the PUCI server 40, the determination result receiving portion 34 outputs the SPIT determination result to the SIP control portion 31. After this, in accordance with the SPIT determination result, for example, the SIP control portion 31 controls to start a session between the IP phone terminal 10 which is a calling source and the IP phone terminal 50 which is a calling destination and/or controls to cancel a session start request from the IP phone terminal 10 which is a calling source.

The PUCI server 40 conducts a predetermined filtering operation which is called a PUCI test by using various identification information transmitted from the SIP server and determines whether or not the IP phone terminal is a transmission source of malicious calls that is identified based on the various identification information. Other than a black list test, a white list test and a statistic analysis, such filtering operations include an operation which uses a gray list described in operation explanations below in detail. In other words, in the PUCI server 40, when the identification information receiving portion 41 receives the various identification information transmitted from the SIP server 30, the identification information receiving portion 41 outputs the various identification information to the SPIT determination portion 42. Further, the SPIT determination portion 42 conducts a filtering operation. The determination result transmission portion 44 transmits the SPIT determination result generated by the SPIT result determination portion 42 to the SIP server 30.

Operations of the IP phone communication system 1 are explained. First, in reference to a sequence chart of FIG. 9, in a case in which the IP phone terminal 10 calls the IP phone terminal 50, an operation until the SIP server 30a receives the SPIT determination result from the PUCI server 40 is explained. When the IP phone terminal 10 calls the IP phone terminal 50, an INVITE message is transmitted by the IP phone terminal 10 under control of the SIP control portion (S301). When the identification information gathering apparatus 20 receives the INVITE message, the SIP control portion 21 inputs the identification information request issued by the identification information request issuing portion 22 and transmits a Trying message (described at S304 below) which is a temporal reply to the INVITE message and to which the identification information request is attached (S302).

When the IP phone terminal 10 receives the Trying message to which the identification information request is attached, the SIP control portion 11 outputs the identification information request to the identification information gathering portion 12. After this, the identification information gathering portion 12 gathers various identification information with regard to the IP phone terminal 10 (S305).

Here, the various identification information is explained in accordance with concrete examples. The various identification information is, for example, apparatus information with regard to an apparatus of the IP phone terminal 10 and/or software which is implemented on the apparatus, user information with regard to an user or an administrator of the IP phone terminal 10, location information with regard to a position or location of the IP phone terminal and time information, that are, property information with regard to the IP phone terminal 10.

In a concrete case, for example, it is possible to use identification information shown in FIG. 4 as such various identification information. In FIG. 4, "CPU ID" is an identification number uniquely assigned to a CPU which is mounted on the IP phone terminal 10, and which is, for example, a production serial number. "OS TYPE" is information indicating a type of an OS (operating system) which is used. "OS VERSION" is version information, serial number and/or version information of a security patch. "SOFTWARE CONFIGURATION" is a list showing the configuration of installed application software.

"SIP ID" is identification information of the IP phone terminal 10 for identifying the terminal when using the SIP. "IMSI (international mobile subscriber identity)" is subscriber information which is assigned if the IP phone terminal 10 is a cellular phone. "LOCATION INFORMATION" is positioning information which is measured if a GPS measuring function is included in the IP phone terminal 10, and which is, for example, longitude and latitude. "TIME INFORMATION" is time information obtained when the identification information gathering portion 12 gathers the identification information.

Figure 3:
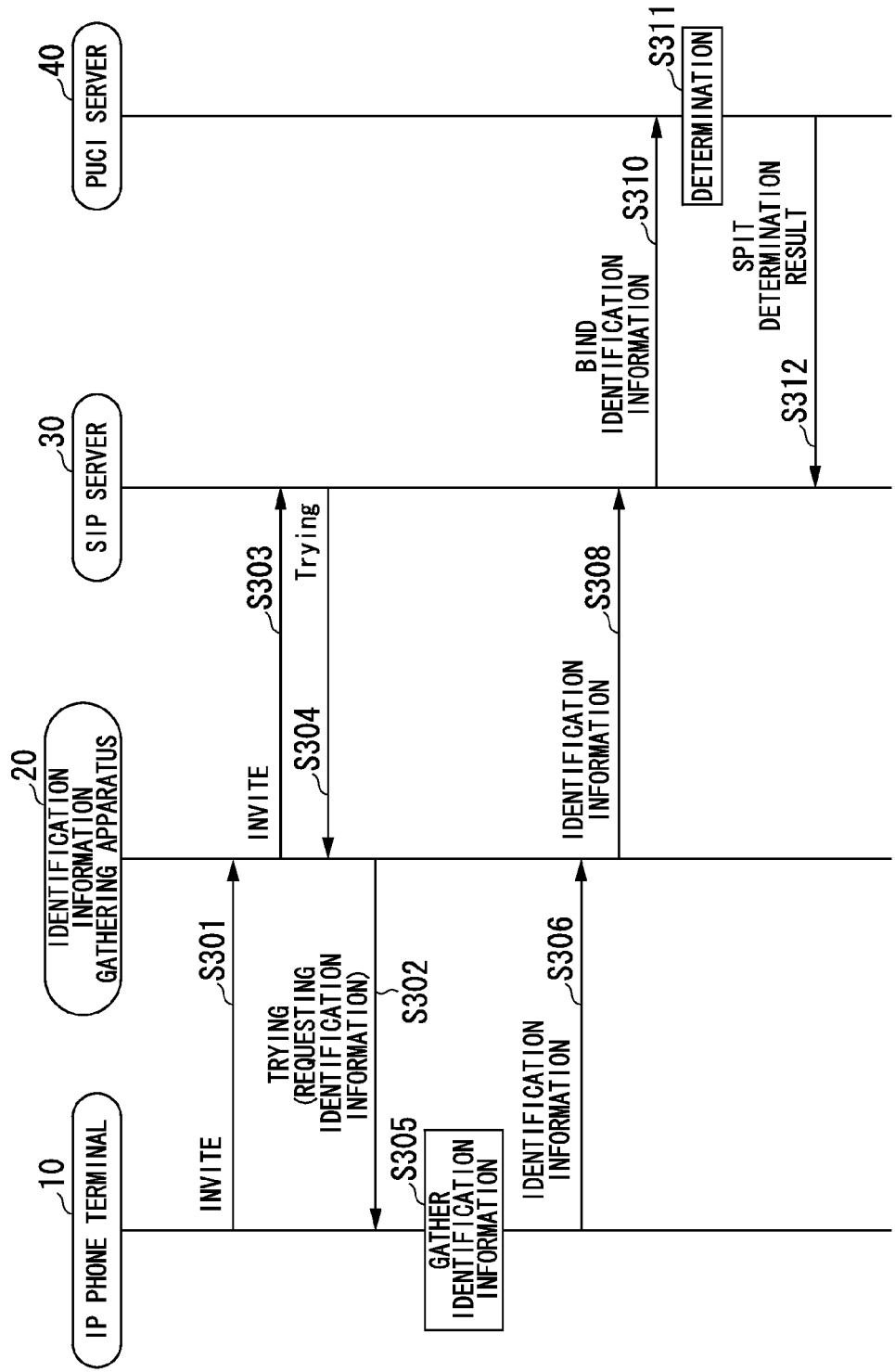
FIG. 3 is a sequence chart of a first embodiment showing an operation flow until receiving a SPIT determination result by an SIP server from a PUCI server when a call is made from an IP phone terminal.

In FIG. 3, when the identification information gathering portion 12 of the IP phone terminal 10 has gathered the various identification information shown in FIG. 4, the identification information gathering portion 12 outputs the gathered information to the identification information transmission portion 13, and the identification information transmission portion 13 transmits the various identification information to the identification information gathering apparatus 20 without using the SIP (S306).

On the other hand, the identification information gathering apparatus which has received the INVITE message from the IP phone terminal 10 in accordance with the operation of S301 transmits the received INVITE message to the SIP server 30 under control by the SIP control portion 21 (S303). When the SIP server 30 receives the INVITE message, the SIP control portion 31 transmits the Trying message which is a temporal response to the received INVITE message to the identification information gathering apparatus 20 (S304). Here, the SIP control portion 31 suspends transmission to the IP phone terminal 50 which is a calling destination of the INVITE message.

In the identification information gathering apparatus 20, when the identification information receiving portion 23 receives the various identification information which is transmitted from the IP phone terminal 10 in accordance with the operation of S306, the identification information receiving portion 23 outputs the various identification information to the identification information transmission portion 24, and the identification information transmission portion 24 transmits the various identification information to the SIP server 30a (S308).

It should be noted that the identification information gathering apparatus 20 checks the content of the various identification information received from the IP phone terminal 10. It is possible for the identification information gathering apparatus 20 to conduct a controlling operation in which, for example, if the identification information does not include at least a MAC address, an IP address and an SIP ID, the identification information request is retransmitted to the IP phone terminal 10.

The SIP server 30 controls the identification information receiving portion 32 to receive the various identification information transmitted from the identification information gathering apparatus 20. The identification information receiving portion 32 generates bind identification information by binding or associating the data of the received various identification information with each other and outputs the bind identification information to the identification information transmission portion 33. Further, the identification information transmission portion 33 transmits the bind identification information to the PUCI server 40 (S310).

In the PUCI server 40, when the identification information receiving portion 41 receives the bind identification information from the SIP server 30, the identification information receiving portion 41 outputs the bind identification information to the SPIT determination portion 42. After this, the SPIT determination portion 42 conducts a filtering operation based on both the bind identification information and a gray list which is stored in the list storing portion 43 and determines whether or not the IP phone terminal 10 which is identified based on the bind identification information is a calling source of malicious calls (S311).

Figure 5:
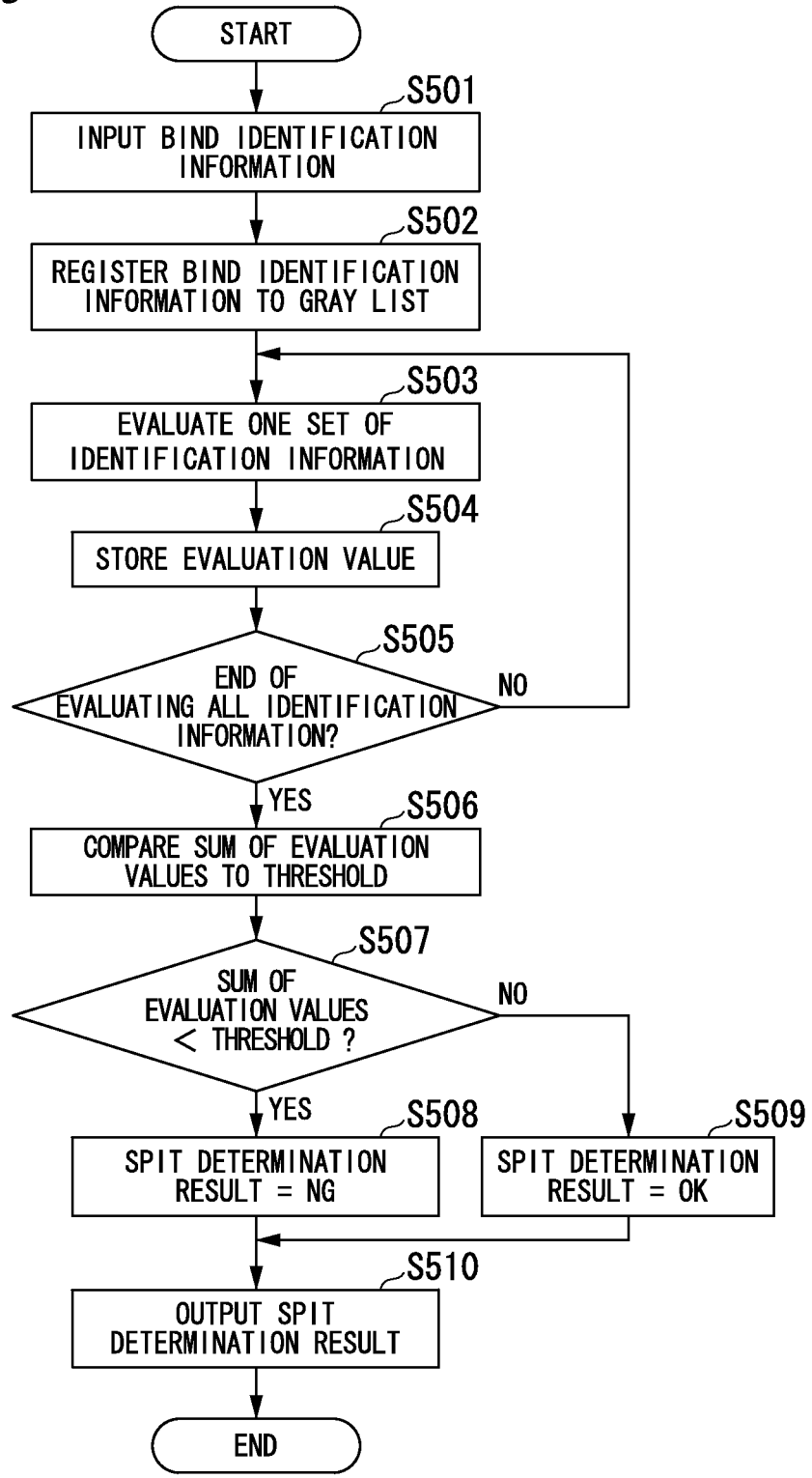
FIG. 5 is a flowchart showing a flow of a filtering operation which is conducted by a SPIT determination portion.

Here, the filtering operation conducted by the SPIT determination portion 42 is explained in reference to a flowchart of FIG. 5. When the SPIT determination portion 42 receives the bind identification information (input bind identification information) input from the identification information receiving portion 41 (S501), the SPIT determination portion 42 registers the bind identification information to the gray list stored in the list storing portion 43 (S502). The bind identification information in the past has been recorded in the gray list.

The SPIT determination portion 42 selects one item of the identification information which constitutes the input bind identification information and calculates an evaluation value (S503). A weight coefficient is provided at the SPIT determination portion 42 beforehand that indicates importance upon evaluation with regard to each type of the identification information stored in the gray list. In this embodiment, a calculation method of the evaluation value and the weight coefficient are set beforehand so as to indicate a comparatively small possibility of a transmission source of the malicious call if the evaluation value is comparatively large. Further, the calculated evaluation value is stored (S504), and the evaluation value is calculated with regard to all identification information which constitutes the input bind identification information (S505 NO→S503, S504).

After this, the SPIT determination portion 42 compares the sum of evaluation results to a predetermined threshold (S506). Further, if the comparison result indicates "smaller than the threshold", the SPIT determination portion 42 sets "NG" to the evaluation result, in other words, a result indicating that the IP phone terminal 10 is a transmission source of malicious calls (S508), and if the comparison result indicates "the same or larger than the threshold", the SPIT determination portion 42 sets "OK" to the evaluation result, in other words, a result indicating that the IP phone terminal 10 is not a transmission source of malicious calls (S509). After this, the SPIT determination portion 42 outputs the SPIT determination result to the determination result transmission portion 44 (S510).

In FIG. 3, the determination result transmission portion 44 which has inputted the SPIT determination result transmits the SPIT determination result to the SIP server 30 (S312). After this, the determination result receiving portion 34 of the SIP server 30 receives the SPIT determination result.

Figure 6:
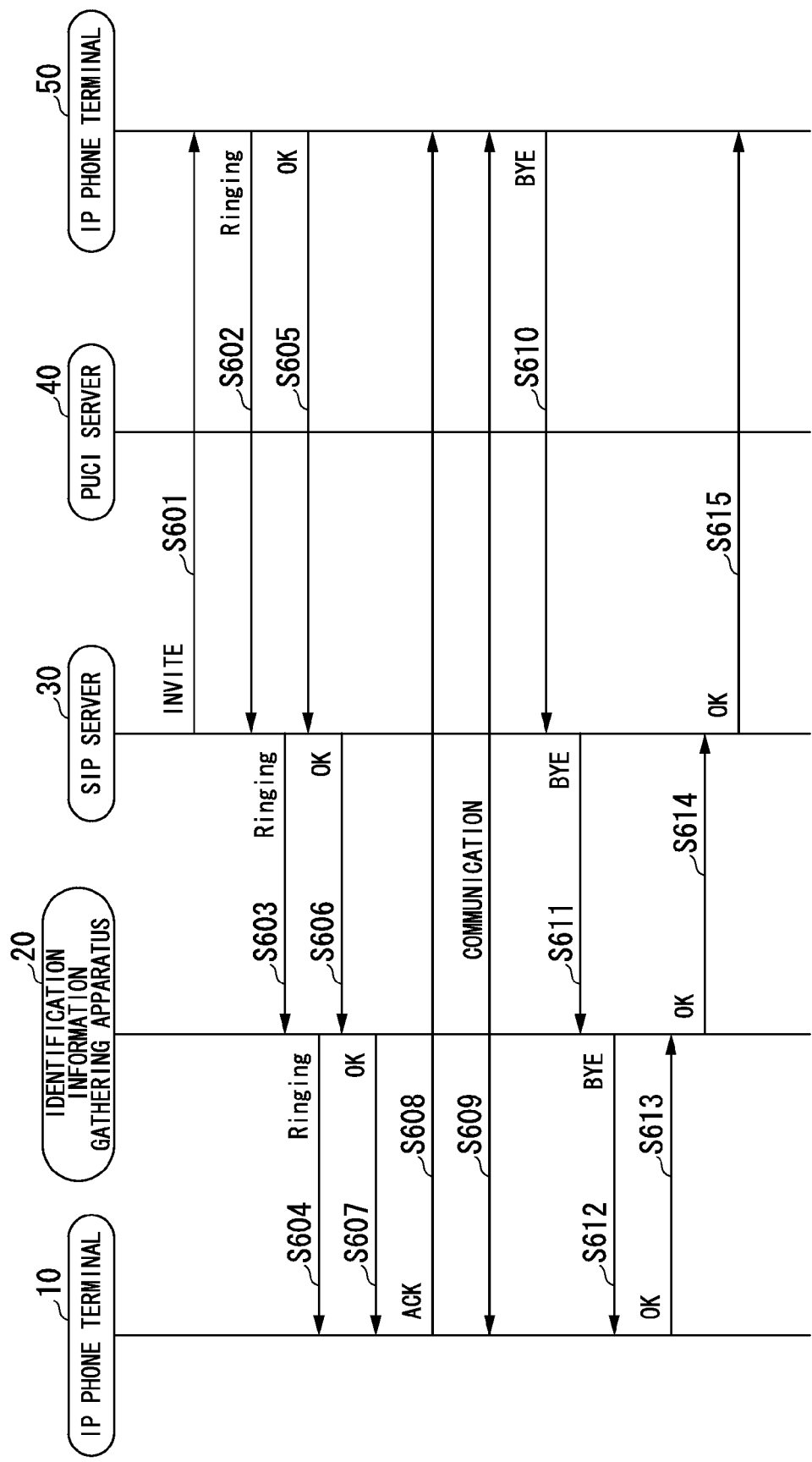
FIG. 6 is a sequence chart showing an operation flow of an IP phone communication system after receiving a SPIT determination result by an SIP server transmitted from a PUCI server.
Figure 7:
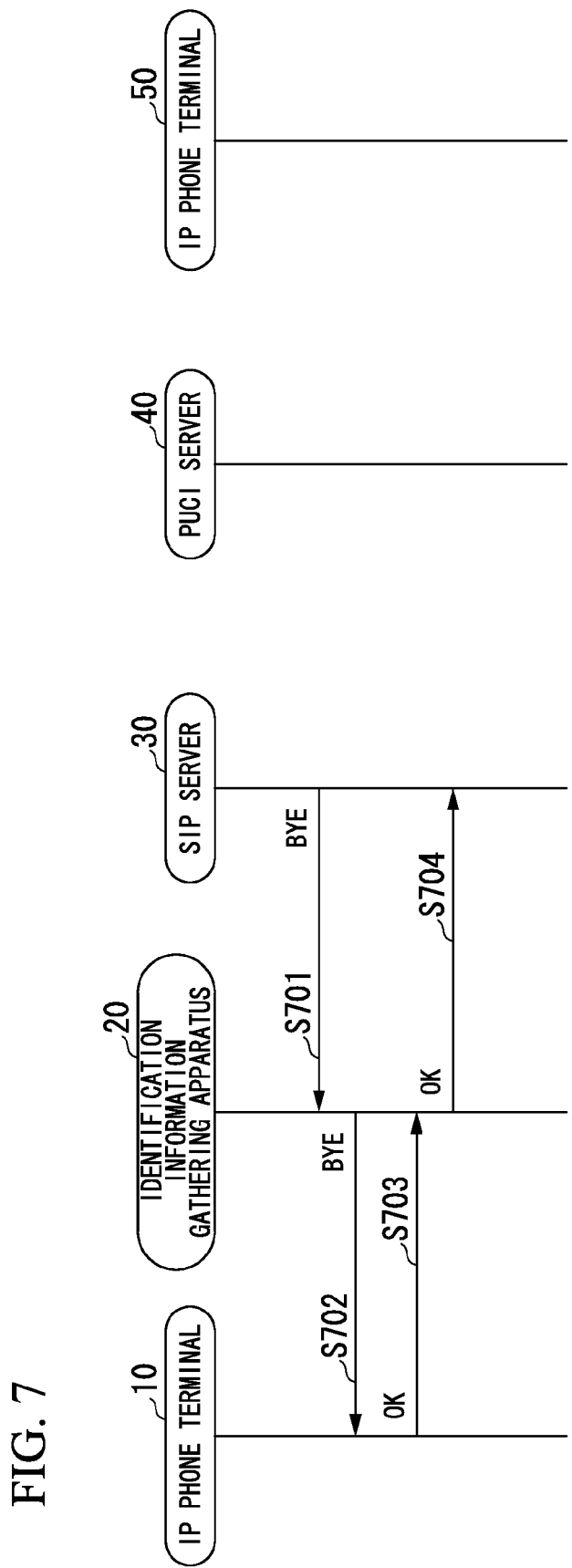
FIG. 7 is a sequence chart showing an operation flow of an IP phone communication system after receiving a SPIT determination result by an SIP server transmitted from a PUCI server.

Operations of the SIP server 30 after receiving the SPIT determination result transmitted from the PUCI server 40 are explained in reference to sequence charts of FIGS. 6 and 7.

FIG. 6 is an example of a sequence chart in a case in which the SPIT determination result is "OK". The determination result receiving portion 34 of the SIP server 30 outputs the SPIT determination result="OK" to the SIP control portion 31, and based on control by the SIP control portion 31, the SIP server 30 transmits the INVITE message received in accordance with operations of S303→S304 to the IP phone terminal 50 which is a calling destination (S602).

After receiving the INVITE message (incoming call), the IP phone terminal 50 switches to a calling operation and transmits a Ringing message which is a temporal reply to IP phone terminal 10 via both the SIP server 30 and the identification information gathering apparatus 20 (S602, S603 and S604). After this, when a handset of the IP phone terminal 50 is picked up by a user, the IP phone terminal 50 transmits an OK message to the IP phone terminal 10 via the SIP server 30 and the identification information gathering apparatus 20 for notifying that a session attendance request from the IP phone terminal 10 is succeeded (S605, S606 and S607).

After receiving the OK message, the IP phone terminal 10 transmits an ACK message which is a final response corresponding to the INVITE message transmitted at step S301 described above to the IP phone terminal 50 (S608). Further, a session (communication) is started between the IP phone terminal 10 and the IP phone terminal 50 by using RTP (real-time transport protocol) (S609).

After this, if the session is terminated due to for example, an operation of putting the handset down, the IP phone terminal 50 transmits a BYE message which indicates the end of the session to the IP phone terminal 10 via the SIP server 30 and the identification information gathering apparatus 20 (S610, S611 and S612). After receiving the BYE message, the IP phone terminal 10 transmits an OK message to the IP phone terminal 10 via both the identification information gathering apparatus 20 and the SIP server 30 (S613, S614 and S615).

On the other hand, FIG. 7 is an example of a sequence chart including a case in which the SPIT determination result is "NG". When the determination result receiving portion 34 of the SIP server 30 outputs the SIP determination result="NG", the SIP server 30, in accordance with control by the SIP control portion 30, transmits a BYE message for cancelling operations to the IP phone terminal 10 which is a calling source via the identification information gathering apparatus 20 (S701 and S702). After receiving the BYE message, the IP phone terminal 10 transmits an OK message to the IP phone terminal 10 via the identification information gathering apparatus 20 (S703 and S704).

Second Embodiment

In the first embodiment of the present invention, an example without using an SIP is explained as a constitution and operation steps for transmitting the various identification information from the IP phone terminal 10 which is monitored to the identification information gathering apparatus 20. In a second embodiment, an example using a REGISTER message of the SIP as a means for transmitting the various identification information is explained. The IP phone communication system 1*a* of this embodiment includes IP phone terminals 10*a* and 50*a*, an identification information gathering apparatus 20*a* and the SIP server 30*a* that are obtained by applying modifications to a portion of constitutional elements of IP phone terminals 10 and 50, the identification information gathering apparatus 20 and the SIP server 30 included in the IP phone communication system 1 of the first embodiment. In the explanation of this embodiment below, the same reference numerals as the first embodiment are applied to blocks that are the same blocks as shown in the first embodiment, and the explanations thereof are omitted. Further, the same step numerals as the first embodiment are applied to steps that are the same steps as shown in the first embodiment, and the explanations thereof are omitted.

Figure 8:
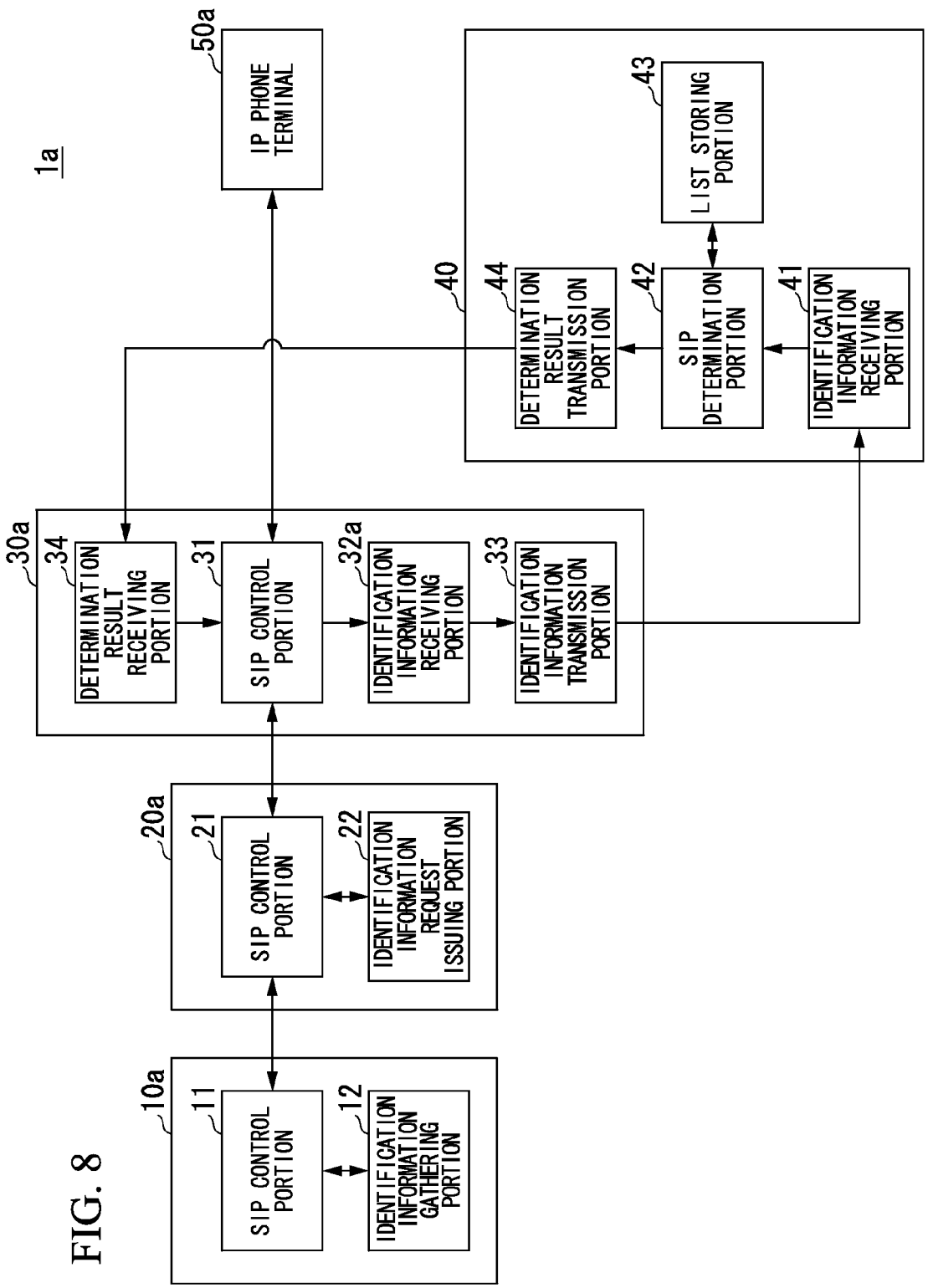
FIG. 8 is a functional block diagram showing main functional blocks which are necessary for explaining an IP phone communication system of a second embodiment.

In FIG. 8 is a block diagram showing main functional blocks which are necessary for explaining the IP phone communication system 1a of this embodiment. In FIG. 8, compared to the IP phone terminal 10, the IP phone terminal 10a has a constitution without the identification information transmission portion 13. It is not shown in the drawings, however, the IP phone terminal 50a and the IP phone terminal 10a have the same constitution. Further, compared to the identification information gathering apparatus 20, the identification information gathering apparatus 20a has a constitution without the identification information receiving portion 23 and the identification information transmission portion 24. In addition, compared to the SIP server 30, the SIP server 30a includes an identification information receiving portion 32a which has a modified constitution of the identification information receiving portion 32.

Hereinafter, operations of the IP phone communication system 1a are explained. In reference to a sequence chart of FIG. 9, in a case in which the IP phone terminal 10a calls the IP phone terminal 50a, an operation until the SIP server 30a receives the SPIT determination result from the PUCI server 40 is explained. When, for example, the IP phone terminal 10a is turned on or rebooted, the IP phone terminal 10a transmits a REGISTER message in accordance with control by the SIP control portion 11 (S901). When the identification information gathering apparatus 20 receives the REGISTER message, the SIP control portion 21 replies an Unauthorized message because the received message does not include an authentication header. In such an operation, the SIP control portion 21 receives an identification information request from the identification information request issuing portion 22, attaches identification information request to the Unauthorized message (S904 described below) and transmits the Unauthorized message to the IP phone terminal 10a (S902).

When the IP phone terminal 10a receives the Unauthorized message to which the identification information request is attached, the SIP control portion 11 outputs an identification information request to the identification information gathering portion 12. After this, the identification information gathering portion 12 gathers various identification information with regard to the IP phone terminal 10a (S905).

Figure 9:
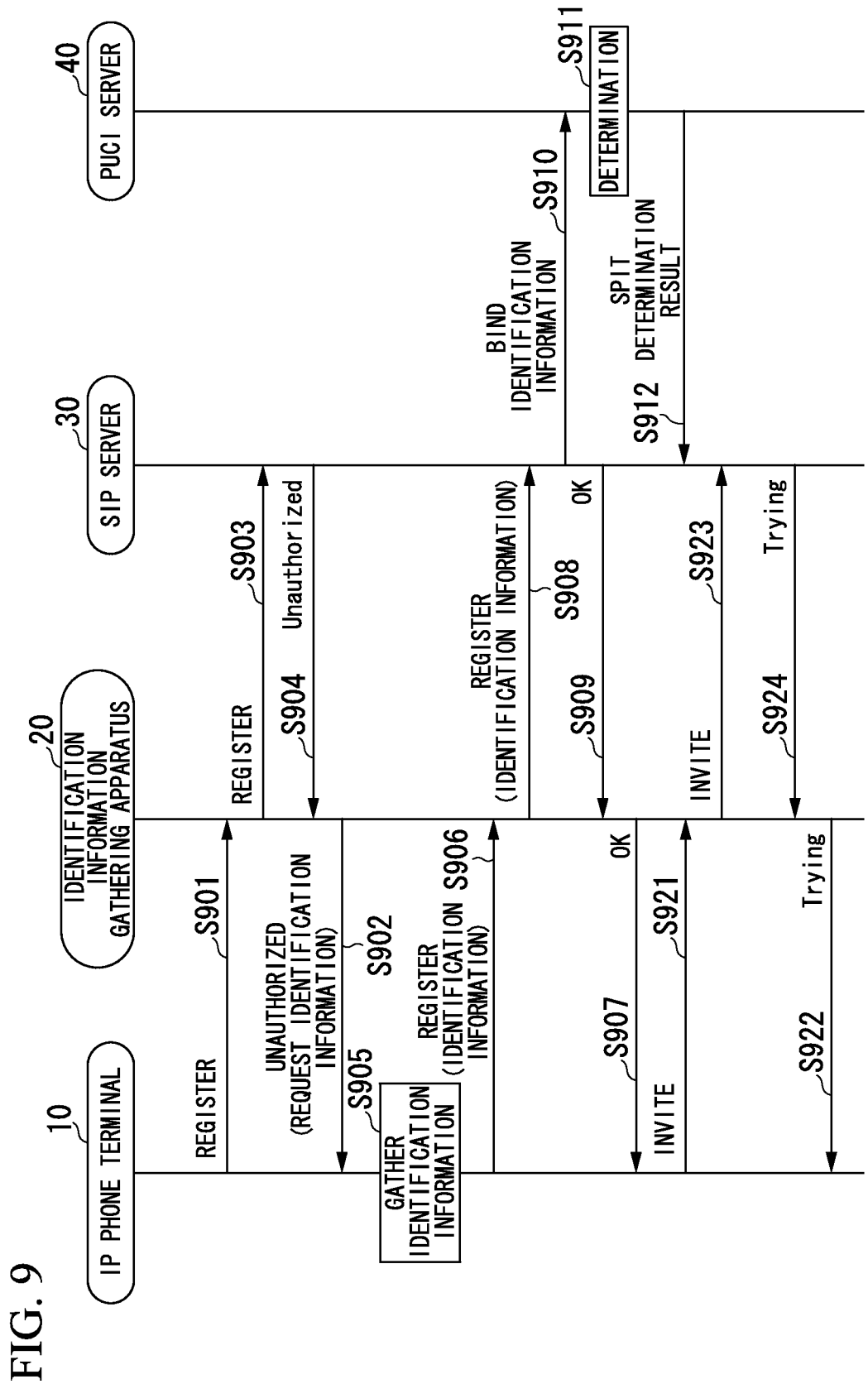
FIG. 9 is a sequence chart of a second embodiment showing an operation flow until receiving a SPIT determination result by an SIP server from a PUCI server when a call is made from an IP phone terminal.

In FIG. 9, when the identification information gathering portion 12 of the IP phone terminal 10a gathers the various identification information, the identification information gathering portion 12 outputs them to the SIP control portion 11, and the SIP control portion 11 transmits the gathered various identification information to the identification information gathering apparatus 20a by using a REGISTER message (S906). When the identification information gathering apparatus 20a receives the REGISTER message, (after OK message at S909 described below) the SIP control portion 21 transmits an OK message which indicates normal reception to the IP phone terminal 10a (S907).

On the other hand, the identification information gathering apparatus 20a which has received the REGISTER message transmitted from the IP phone terminal 10a in accordance with operations of step S901 transmits the received REGISTER message to the SIP server 30a in accordance with control by the SIP control portion 21 (S903). When the SIP server 30a receives the REGISTER message, the SIP control portion 31 transmits an Unauthorized message to the identification information gathering apparatus 20a because the received message does not include an authentication header (S904).

The identification information gathering apparatus 20a which has received the REGISTER message transmitted from the IP phone terminal 10a in accordance with operations of step S906 transmits the received REGISTER message to the SIP server 30a in accordance with control by the SIP control portion 21 (S908). When the SIP server 30a receives the REGISTER message, the SIP control portion 31 transmits an OK message which indicates normal reception to the identification information gathering apparatus 20a (S909).

It should be noted that the identification information gathering apparatus 20a checks the various identification information included in the REGISTER message received from the IP phone terminal 10a. If, for example, the REGISTER message does not include at least a MAC address, an IP address and an SIP ID, it is possible for the identification information gathering apparatus 20a to conducts operation so as to request the IP phone terminal 10a to send the identification information request again.

The SIP server 30a receives the REGISTER message which has been transmitted from the identification information gathering apparatus 20a in step S908 and the SIP control portion 31 outputs the various identification information included in the REGISTER message to the identification information receiving portion 32a. The identification information receiving portion 32a bind identification information by binding or associating the data of the inputted various identification information with each other and outputs the bind identification information to the identification information transmission portion 33. The identification information transmission portion 33 transmits the bind identification information to the PUCI server 40 (S910).

The identification information receiving portion 41 receives the bind identification information from the SIP server 30a and outputs the bind identification information to the SPIT determination portion 42. After this, the SPIT determination portion 42 conducts a filtering operation based on both the bind identification information and a gray list which is stored in the list storing portion 43 and determines whether or not the IP phone terminal 10a which is identified based on the bind identification information is a calling source of malicious calls (S911). The determination method is the same as described in the first embodiment, and therefore, a description thereof is omitted here.

It should be noted that it is preferable that the PUCI server 40 may gather the data of the gray list from IP phone terminals which are accessible via the network 60 at a different time from the time when a calling control operation is conducted by the SIP server 30a and store them in the list storing portion 43 beforehand. For example, it is preferable to gather them periodically, for example, once in an hour, and to store them in the list storing portion 43 beforehand. Further, for example, it is possible to gather information by conducting scanning operations on data exchanging operation with, for example, the IP phone terminals, the SIP server and the Web server, and to store them in the list storing portion 43.

The determination result transmission portion 44 which has inputted the SPIT determination result transmits the SPIT determination result to the SIP server 30a (S912). The determination result receiving portion 34 of the SIP server 30a receives the SPIT determination result.

Further, the IP phone terminal 10a which has received the OK message in accordance with operations at step S907 transmits an INVITE message to the IP phone terminal 50a for calling in accordance with control by the SIP control portion 11 (S921). When the identification information gathering apparatus 20a receives the INVITE message, (after the Trying message at S924) the SIP control portion 21 transmits the Trying message which is a temporal reply to the INVITE message to the IP phone terminal 10a (S922).

The identification information gathering apparatus 20a which has received the INVITE message transmitted from the IP phone terminal 10a transmits the received INVITE message to the SIP server 30a in accordance with control by the SIP control portion 21 (S923). When the SIP server 30a receives the INVITE message, the SIP control portion 31 transmits the Trying message which is a temporal response to the received INVITE message to the identification information gathering apparatus 20a (S924). Here, the SIP control portion 31 suspends transmission to the IP phone terminal 50a which is a calling destination of the INVITE message.

Operations of the SIP server 30a which has received the SPIT determination result transmitted from the PUCI server 40 are the same as operations shown in the sequence charts of FIGS. 6 and 7 described in the first embodiment, and therefore, explanations thereof are omitted here.

Third Embodiment

In a third embodiment, an example is explained in which an identification information gathering apparatus is connected to or installed in a router. The IP phone communication system 1b of this embodiment has an constitution which includes an identification information gathering apparatus 20b and an SIP server 30b that are obtained by applying modifications to a portion of constitutional elements of the identification information gathering apparatus 20 and the SIP server 30 included in the IP phone communication system 1 of the first embodiment, and which additionally includes a router 70. In the explanation of this embodiment below, the same reference numerals as the first embodiment are applied to blocks that are the same blocks as shown in the first embodiment, and explanations thereof are omitted here.

Figure 10:
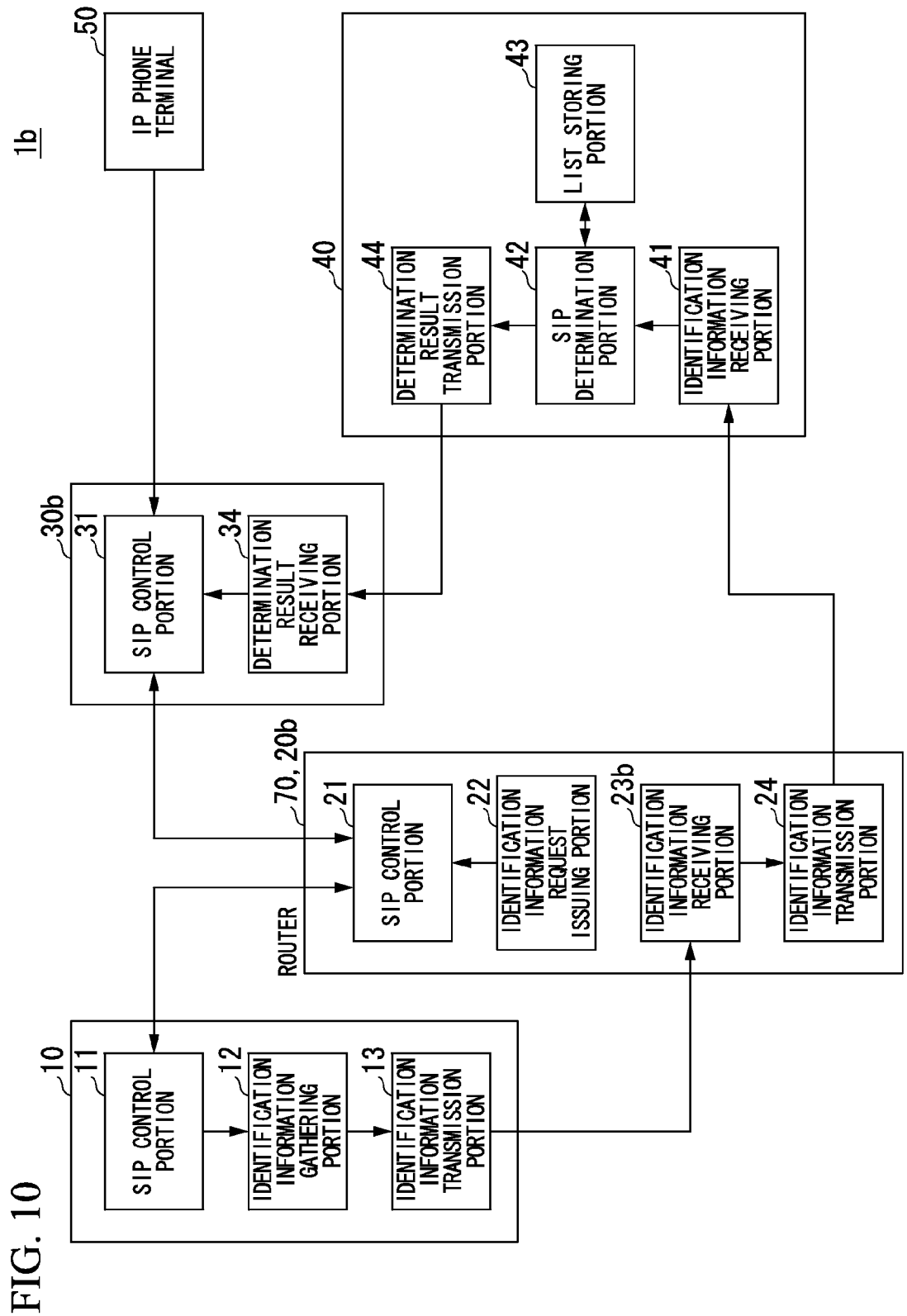
FIG. 10 is a functional block diagram showing main functional blocks which are necessary for explaining an IP phone communication system of a third embodiment.

In FIG. 10 is a block diagram showing main functional blocks which are necessary for explaining the IP phone communication system 1b of this embodiment. In this drawing, compared to the identification information gathering apparatus 20, the identification information gathering apparatus 20b includes an identification information receiving portion 23b which is obtained by adding modifications on a constitution of the identification information receiving portion 23. Further, compared to the SIP server 30, the SIP server 30b has a constitution without the identification information receiving portion 32 and the identification information transmission portion 33.

Figure 11:
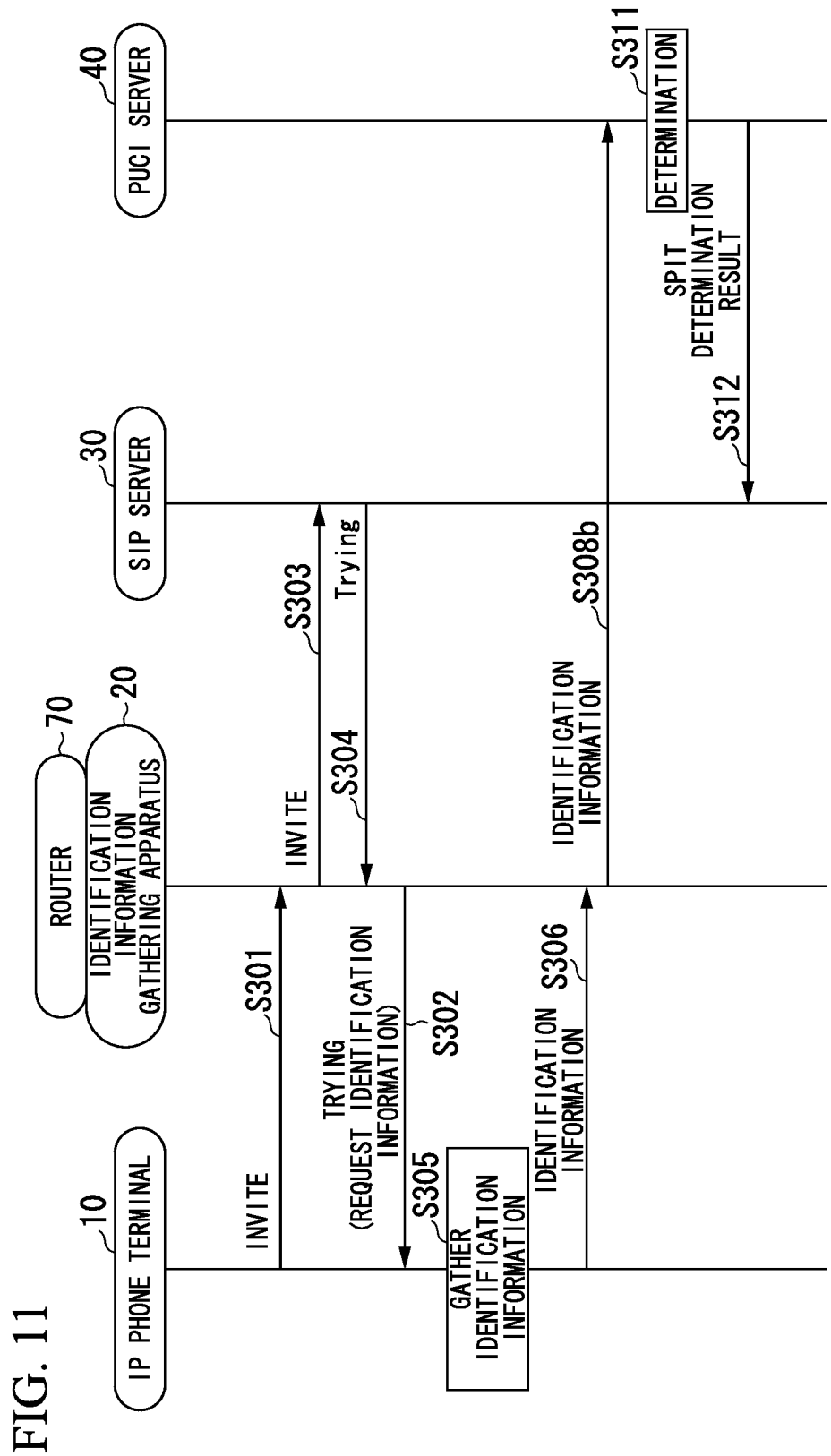
FIG. 11 is a sequence chart of a third embodiment showing an operation flow until receiving a SPIT determination result by an SIP server from a PUCI server when a call is made from an IP phone terminal.

Operations of the IP phone communication system 1b are explained. First, in reference to a sequence chart of FIG. 11, in a case in which the IP phone terminal 10 calls the IP phone terminal 50, an operation until the SIP server 30b receives the SPIT determination result from the PUCI server 40 is explained. It should be noted that the same step numerals as shown in FIG. 3 of the first embodiment are applied to steps that are the same steps as shown in the first embodiment, and explanations thereof are omitted here.

Operations of steps S301-S306 are equivalent to operations shown in FIG. 3 of the first embodiment. However, in this embodiment, the identification information gathering apparatus 20 of the first embodiment conducts communication operations via the router 70. After operations of steps S303 and S304, the SIP control portion 31 of the SIP server 30b stops transmission to the IP phone terminal 50 which is a destination of the INVITE message.

When receiving the various identification information transmitted from the IP phone terminal 10 via the router 70 in accordance with operations of step S306, the identification information gathering apparatus 20b controls the identification information receiving portion 23b to conduct receiving operations. The identification information receiving portion 23b generates bind identification information by binding or associating the data of the received various identification information with each other and outputs the bind identification information to the identification information transmission portion 24. Further, the identification information transmission portion 24 transmits the bind identification information to the PUCI server 40 (S308b). Operations of steps S311 and S312 are the same as operations of the first embodiment described above.

It should be noted that the identification information gathering apparatus 20b checks the content of the various identification information received from the IP phone terminal 10. It is possible for the identification information gathering apparatus 20b to transmit the identification information request to the IP phone terminal 10 again if, for example, the identification information does not include at least a MAC address, an IP address and an SIP ID.

Operations of the SIP server 30b which has received the SPIT determination result transmitted from the PUCI server 40 are the same as operations of the first embodiment described above, and explanations thereof are omitted here.

As described in detail above, the identification information gathering apparatuses of the first to third embodiments receive the various identification information with regard to the IP phone terminal which has issued a call, for example, apparatus information, user information, location information and time information, that are, property information. The PUCI server registers the bind identification information which is generated by binding or associating the various identification information each other to the gray list, evaluates the bind identification information in reference to the gray list from the past and determines whether or not the session start request from the IP phone terminal which is issued beforehand is allowed. The SIP server conducts operations of a session of SIP based on the determination result. Due to this, in the IP phone communication system of each embodiment, it is possible to accurately detect a malicious call of IP phone terminals.

Further, in accordance with the first and third embodiments, transmission and reception of the various identification information between the identification information gathering apparatus and the PUCI server can be conducted without using SIP. Therefore, it is possible to accurately detect malicious calls of the IP phone terminals without increasing operation load on the SIP server. On the other hand, the second embodiment is advantageous to a system using SIP compliance devices because it is possible to operate the IP phone communication system in accordance with an SIP compliance sequence.

It should be noted that, in the second embodiment, the REGISTER message of SIP is used as a means (container) for transmitting the various identification information from the IP phone terminal to the identification information gathering apparatus. However, in place to this, it is possible to use a MESSAGE message of SIP. Further, such constitutions using SIP messages for transmission of the various identification information are sufficiently applicable to the third embodiment.

In addition, a portion of functions of a malicious call detection apparatus which is the above-described embodiment can be implemented on a computer. In such a case, it is possible to record a malicious call detection program which implements control functions thereof on a computer readable recording medium, and implementation can be achieved by using a computer which reads and executes the malicious call detection program recorded on the recording medium. It should be noted that it is possible for a "computer system" described here to include an OS (operating system) and/or hardware, for example, peripheral devices. Further, the "computer readable storage medium" means storage devices that include a flexible disc, a magneto-optical disc, a portable recording medium, for example, a memory card, and a storage device, for example, a hard disc installed in a computer system. Further, the "computer readable recording medium" can include: a medium which dynamically saves the program for a short time, that is, for example, a communication line which is used when transmitting the computer program via a communication line such as a telephone line or via a network such as Internet; and a medium which temporally saves the program, that is, for example, a volatile memory inside a computer system which is used as a server and a client applied to such transmission. Further, the above-described computer program can be a computer program that implements a portion of the above-described functions, and in addition, it is possible to implement the above-described functions by linking with computer programs that are already recorded on the computer system.

The embodiments of the present invention are described above in reference to the drawings, however, a concrete constitution is not limited to these embodiments and include design modifications inside a scope that does not deviate from the gist of the present invention. For example, it is possible to appropriately combine constitutional elements of the embodiments.

INDUSTRIAL APPLICABILITY

For example, the present invention can be applied to an IP phone and can improve accuracy of detecting malicious calls of the IP phone.

DESCRIPTION OF THE REFERENCE SYMBOLS 1, 1a, 1b . . . IP phone communication system
10, 10a, 50, 50a . . . IP phone terminal
11, 21, 31 . . . SIP control portion
12 . . . identification information gathering portion
20, 20a, 20b . . . identification information gathering apparatus
22 . . . identification information issuing request portion
30, 30a, 30b . . . SIP server
23, 23b, 32, 32a, 41 . . . identification information receiving portion
13, 24, 33 . . . identification information transmission portion
34 . . . determination result receiving portion
40 . . . PUCI server
42 . . . SPIT determination portion
43 . . . list storing portion
44 . . . determination result transmission portion
60 . . . network
70 . . . router

The invention claimed is:
1. A malicious call detection apparatus comprising:
a processor;
a memory storing a plurality of portions comprising instructions for execution on the processor, the plurality of portions including:
an input portion which receives, from an IP communication apparatus, a session start request and a plurality of types of identification information with regard to the IP communication apparatus which issued the session start request;
a storing portion which binds said plurality of types of the received identification information to generate bind identification information and stores the identification information by registering the identification information to a list; and
a determination portion which, with regard to each of the plurality of types of identification information constituting the bind identification information stored in the storing portion evaluates said plurality of types of identification information by using weight coefficients that are predetermined with regard to each type of the identification information to indicate a comparatively low possibility that a calling source is a source of a malicious call if an evaluated value is comparatively large, and which, based on a comparison result between a sum of evaluated values of the plurality of types of identification information and a determined threshold, determines whether or not the session start request from the IP communication apparatus is allowed;
wherein said plurality of types of the identification information includes apparatus information with regard to the IP communication apparatus, user information, location information and time information.

2. The malicious call detection apparatus according to claim 1, wherein the identification information further includes MAC address apparatus information, CPU ID apparatus information, OS type apparatus information, OS version apparatus information, software constitution apparatus information, SIP ID user information, IMSC user information IP address location information, location information or time information.

3. A malicious call detection method comprising:
a receiving step of receiving, from an IP communication apparatus, a session start request and a plurality of types of identification information with regard to the IP communication apparatus which issued the session start request,
a storing step of binding said plurality of types of the received identification information to generate bind identification information and storing the identification information by registering the identification information to a list; and
a determination step, with regard to each of the plurality of types of identification information constituting the bind identification information stored in the storing step of evaluating said plurality of types of identification information by using weight coefficients that are predetermined with regard to each type of the identification information to indicate a comparatively low possibility that a calling source is a source of a malicious call if an evaluated value is comparatively large, and which, based on a comparison result between a sum of evaluated values of the plurality of types of identification information and a determined threshold, determines whether or not the session start request from the IP communication apparatus is allowed;
wherein said plurality of types of the identification information includes apparatus information with regard to the IP communication apparatus, user information, location information and time information.

4. The malicious call detection method according to claim 3, wherein the identification information further includes MAC address apparatus information, CPU ID apparatus information, OS type apparatus information, OS version apparatus information, software constitution apparatus information, SIP ID user information, IMSC user information IP address location information, location information or time information.

5. A malicious call detection program which is a computer program stored in a non-transitory computer readable recording medium of a malicious call detection apparatus connected to a plurality of IP communication apparatuses via a network, and which is executed by a computer of the malicious call detection apparatus, the malicious call detection program comprising instructions for execution of:
- a receiving step of receiving, from an IP communication apparatus, a session start request and a plurality of types of identification information with regard to the IP communication apparatus which issued the session start request,
- a storing step of binding said plurality of types of the received identification information to generate bind identification information and stores the identification information by registering the identification information to a list; and
- a determination step, with regard to each of the plurality of types of identification information constituting the bind identification information stored in the storing step of evaluating said plurality of types of identification information by using weight coefficients that are predetermined with regard to each type of the identification information to indicate a comparatively low possibility that a calling source is a source of a malicious call if an evaluated value is comparatively large, and which, based on a comparison result between a sum of evaluated values of the plurality of types of identification information and a determined threshold, determines whether or not the session start request from the IP communication apparatus is allowed;
- wherein said plurality of types of the identification information includes apparatus information with regard to the IP communication apparatus, user information, location information and time information.

* * * * *